United States Patent
Haneline (10) Patent No.: US 11,931,721 B2
(45) Date of Patent: Mar. 19, 2024

(54) ORGANIC SOIL AMENDMENTS WITH IONS BOUND THERETO FOR REMOVING CONTAMINANTS FROM AQUEOUS STREAMS

(71) Applicant: Neo Water Treatment LLC, Greenwood Village, CO (US)

(72) Inventor: Mason Reames Haneline, Orange, CA (US)

(73) Assignee: Neo Water Treatment, LLC, Greenwood Village, CO (US)

( * ) Notice: Subject to any disclaimer, the term of this patent is extended or adjusted under 35 U.S.C. 154(b) by 38 days.

(21) Appl. No.: 17/718,075

(22) Filed: Apr. 11, 2022

(65) Prior Publication Data
US 2022/0323936 A1    Oct. 13, 2022

Related U.S. Application Data

(60) Provisional application No. 63/173,256, filed on Apr. 9, 2021.

(51) Int. Cl.
| | |
|---|---|
| *B01J 20/28* | (2006.01) |
| *B01J 20/32* | (2006.01) |
| *C02F 1/00* | (2023.01) |
| *C02F 1/28* | (2023.01) |
| *C08K 3/22* | (2006.01) |
| *C02F 101/10* | (2006.01) |
| *C02F 101/36* | (2006.01) |
| *C02F 103/00* | (2006.01) |

(52) U.S. Cl.
CPC ....... *B01J 20/28026* (2013.01); *B01J 20/321* (2013.01); *C02F 1/008* (2013.01); *C02F 1/288* (2013.01); *C08K 3/22* (2013.01); *C02F 1/281* (2013.01); *C02F 1/285* (2013.01); *C02F 2101/103* (2013.01); *C02F 2101/105* (2013.01); *C02F 2101/36* (2013.01); *C02F 2103/001* (2013.01); *C08K 2003/221* (2013.01); *C08K 2003/2213* (2013.01); *C08K 2003/2227* (2013.01); *C08K 2003/2265* (2013.01)

(58) Field of Classification Search
CPC .... B01J 20/28; B01J 20/28026; B01J 20/321; C02F 1/008; C02F 1/288; C02F 1/281; C02F 1/285; C02F 2101/103; C02F 2101/105; C02F 2101/36; C02F 2103/001; C08K 3/22; C08K 2003/221; C08K 2003/2213; C08K 2203/2227; C08K 2003/22265
USPC ........................................................ 502/402
See application file for complete search history.

(56) References Cited

U.S. PATENT DOCUMENTS

| | | |
|---|---|---|
| 6,312,604 B1 | 11/2001 | Denkewicz |
| 2004/0144729 A1 | 7/2004 | Witham |
| 2009/0111689 A1 | 4/2009 | Burba |

OTHER PUBLICATIONS

International Search Report and Written Opinion issued in corresponding International Application No. PCT/US2022/024282 dated Jul. 26, 2022.

*Primary Examiner* — Edward M Johnson
(74) *Attorney, Agent, or Firm* — Melissa M. Hayworth; George C. Lewis; Merchant & Gould P.C.

(57) ABSTRACT

A composition for treating water including an organic soil amendment and having ions bound thereto is beneficial to aid in the removal of aqueous contaminants, such as phosphate, other phosphorus containing compounds, arsenic, arsenic containing compounds, fluorides, and PFAS from water. In these compositions the ions include rare earth cations, iron cations, and mixtures thereof. There are also methods for making these soil amendment compositions, as well as methods for using these compositions to effectively remove contaminants from water.

13 Claims, 5 Drawing Sheets

ORGANIC SOIL AMENDMENTS WITH IONS BOUND THERETO FOR REMOVING CONTAMINANTS FROM AQUEOUS STREAMS

RELATED APPLICATION

This application claims priority to and benefit of U.S. Provisional Application No. 63/173,256 filed Apr. 9, 2021, the contents of which are hereby incorporated by reference in their entirety.

FIELD OF THE INVENTION

This disclosure relates to a composition for treating water comprising an organic soil amendment and cations, wherein the cations are bound to the soil amendment and the cations are selected from rare earth cations, iron cations, or mixtures thereof. These compositions can be used as adsorption media for water treatment, particularly for treating water to remove phosphorus, arsenic, fluoride, or PFAS contaminants.

INTRODUCTION

Soil amendments are materials added to soil to improve the abilities or physical properties of the soil. The typical goal is to provide a healthier environment for root growth. Another goal of soil amendments is to immobilize contaminants to limit bioavailability. Commonly used amendments can be classified broadly as inorganic amendments or organic amendments. Organic amendments contain carbon-based materials and inorganic amendments are based on minerals or metal materials.

Organic amendments include, for example, sphagnum peat, wood chips, grass clippings, straw, compost, manure, biosolids, sawdust, wood ash, humic acid, salts or esters of a humic acid, and superabsorbent polymers (SAPs), and the like. SAPs are polymeric materials with strong hydrophilic groups that can absorb large amounts of water. SAPs are typically polyacrylate based materials. Inorganic amendments include vermiculite, perlite, tire chunks, pea gravel, sand, bentonite clay, granular ferric oxide, and the like.

Recently there has been interest in using soil amendments to bind water contaminants in runoff. Contaminants in runoff can be nutrients, like phosphates, or pollutants, like fluorides, perfluoroalkyl substances (PFAS), or heavy metals. Excessive nutrients in runoff have been shown to lead to algal blooms in natural water bodies, which leads to eutrophication of the water body. Excessive pollutants in runoff leads to polluted and toxic water bodies. Both of these lead to environmental contamination and toxic drinking water sources. As human development continues the risk of polluted and toxic water bodies continues to increase, thus continued efforts to limit contamination in runoff are needed.

SUMMARY

Disclosed herein is a composition for treating water. This composition comprises an organic soil amendment and ions bound to the soil amendment. These ions can be rare earth cations, iron cations, or mixtures thereof. In certain embodiments the ions are iron cations. In other embodiments, the ions are rare earth cations. The composition comprises about 1% to about 50% by weight of these cations based on the total weight of the composition, not taking into account any water present in the composition. In certain embodiments the compositions comprises about 10% to about 40% by weight of these cations based on the total weight of the composition, not taking into account any water present in the composition.

In one embodiment this composition comprises (a) an organic soil amendment selected from the group consisting of superabsorbent polymers (SAPs), humic acid, humic acid salts, humic acid esters, and mixtures thereof and (b) rare earth cations, wherein the cations are bound to the soil amendment and wherein the composition comprises about 1% to about 50% by weight rare earth cations based on the total weight of the composition not taking into account any water present in the composition.

In another embodiment this composition comprises (a) an organic soil amendment selected from the group consisting of superabsorbent polymers (SAPs), humic acid, humic acid salts, humic acid esters, and mixtures thereof and (b) iron cations, wherein the cations are bound to the soil amendment and wherein the composition comprises about 1% to about 50% by weight iron cations based on the total weight of the composition not taking into account any water present in the composition.

Also as disclosed herein is a method for removing contaminants from an aqueous stream, comprising the steps of: (i) contacting an aqueous stream having a first contaminant concentration with a composition for treating water comprising (a) an organic soil amendment selected from the group consisting of superabsorbent polymers (SAPs), humic acid, humic acid salts, humic acid esters, and mixtures thereof and (b) rare earth cations, wherein the cations are bound to the soil amendment and wherein the composition comprises about 1% to about 50% by weight rare earth cations based on the total weight of the composition not taking into account any water present in the composition; (ii) removing contaminant from the aqueous stream by contact of the aqueous stream with the composition; and (iii) providing a treated aqueous stream with a second contaminant concentration less than the first contaminant concentration. In these methods, the contaminant is selected from the group consisting of phosphate, phosphorus containing compounds, arsenic, arsenic containing compounds, PFAS, fluorides, and mixtures thereof. In certain embodiments, the second contaminant concentration is about 50% to about 90% less than the first contaminant concentration.

This method may further include a step of setting a target contaminant concentration and monitoring the second contaminant concentration to ensure that it is at or less than the target concentration. With these additional steps, the method may further comprise comparing the second contaminant concentration to the target concentration and replacing the composition for treating water when the second contaminant concentration in the treated aqueous stream exceeds the target concentration. The method may further comprise monitoring the second contaminant concentration and replacing the composition for treating water when the second contaminant concentration in the treated aqueous stream begins to increase.

In another embodiment, the method for removing contaminants from an aqueous stream, comprising the steps of: (i) contacting an aqueous stream having a first contaminant concentration with a composition for treating water comprising (a) an organic soil amendment selected from the group consisting of superabsorbent polymers (SAPs), humic acid, humic acid salts, humic acid esters, and mixtures thereof and (b) iron cations, wherein the cations are bound to the soil amendment and wherein the composition comprises about 1% to about 50% by weight iron cations based on the total weight of the composition not taking into account any water present in the composition; (ii) removing contaminant from the aqueous stream by contact of the aqueous stream with the composition; and (iii) providing a treated aqueous stream with a second contaminant concentration less than the first contaminant concentration. In these methods, the contaminant is selected from the group consisting of phosphate, phosphorus containing compounds, arsenic, arsenic containing compounds, PFAS, fluorides, and mixtures thereof. In certain embodiments, the second contaminant concentration is about 50% to about 90% less than the first contaminant concentration.

This method may further include a step of setting a target contaminant concentration and monitoring the second contaminant concentration to ensure that it is at or less than the target concentration. With these additional steps, the method may further comprise comparing the second contaminant concentration to the target concentration and replacing the composition for treating water when the second contaminant concentration in the treated aqueous stream exceeds the target concentration. The method may further comprise monitoring the second contaminant concentration and replacing the composition for treating water when the second contaminant concentration in the treated aqueous stream begins to increase.

Further disclosed are methods of making these compositions for treating water. In one embodiment the method comprises the steps of: providing an organic soil amendment selected from the group consisting of superabsorbent polymers (SAPs), humic acid, humic acid salts, humic acid esters, and mixtures thereof; and contacting the organic soil amendment with an amount of rare earth salts in water to provide the composition comprising an organic soil amendment with rare earth cations bound to the soil amendment, wherein the composition comprises about 1% to about 50% by weight rare earth cations based on the total weight of the composition not taking into account any water present in the composition. In certain embodiments, the rare earth salts in water are selected from the group consisting of chlorides, sulfates, sulfonates, nitrates, and mixtures thereof.

In another embodiment the methods of making these compositions comprises the steps of: providing an organic soil amendment selected from the group consisting of superabsorbent polymers (SAPs), humic acid, humic acid salts, humic acid esters, and mixtures thereof; and contacting the organic soil amendment with an amount of iron salts in water to provide the composition comprising an organic soil amendment with iron cations bound to the soil amendment, wherein the composition comprises about 1% to about 50% by weight iron cations based on the total weight of the composition not taking into account any water present in the composition. In certain embodiments, the iron salts in water are selected from the group consisting of chlorides, sulfates, sulfonates, nitrates, and mixtures thereof.

DETAILED DESCRIPTION

Before the composition for treating water comprising an organic soil amendment with ions bound to it and methods are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "an amendment composition" is not to be taken as quantitatively or source limiting, reference to "a step" may include multiple steps, reference to "producing" or "products" of a reaction or treatment should not be taken to be all of the products of a reaction/treatment, and reference to "treating" may include reference to one or more of such treatment steps. As such, the step of treating can include multiple or repeated treatment of similar materials/streams to produce identified treatment products.

Numerical values with "about" include typical experimental variances. As used herein, the term "about" means within a statistically meaningful range of a value, such as a stated particle size, weight percent, concentration range, time frame, molecular weight, temperature, or pH. Such a range can be within an order of magnitude, typically within 10%, and even more typically within 5% of the indicated value or range. Sometimes, such a range can be within the experimental error typical of standard methods used for the measurement and/or determination of a given value or range. The allowable variation encompassed by the term "about" will depend upon the particular system under study, and can be readily appreciated by one of ordinary skill in the art. Whenever a range is recited within this application, every whole number integer within the range is also contemplated as an embodiment of the invention.

The present application relates to a composition for treating water including an organic soil amendment with ions bound to it. These ions are selected from rare earth cations, iron cations, or mixtures thereof. In one embodiment, the ions are rare earth cations. In another embodiment, the ions are iron cations. In yet another embodiment, the ions may be a mixture of rare earth cations and iron cations. As such, this composition includes an organic soil amendment and ions selected from rare earth cations, iron cations, and mixtures thereof, wherein the ions are bound to the soil amendment. Without being bound by any theory, the cations of the soil amendment are capable of preventing contaminants from passing through the amendment, which contaminants would otherwise readily pass through. These compositions may be used for water treatment and used in structures for filtering/capturing contaminated water.

The ions of the composition may further include sodium, chloride, nitrate, sulfate, sulfonate, acetate, and mixtures thereof.

As described herein, the organic soil amendment has ions selected from rare earth cations or iron cations bound to it, or associated with it, in some manner. The rare earth cations or iron cations may be associated with the organic soil amendment by any type of attraction, including a van der waals type association, a covalent bond, or an ionic bond. Accordingly, as described herein, the organic amendment with bound or associated rare earth cations or iron cations includes both unbound attraction and chemically bound. In certain embodiments, the cations are bound through ionic bonds.

The soil amendment to which the cations are bound is an organic amendment. Organic amendments include, for example, sphagnum peat, wood chips, grass clippings, straw, compost, manure, biosolids, sawdust, wood ash, humic acid, humic acid salts, humic acid esters, and superabsorbent polymers (SAPs), and the like. In certain embodiments, the organic amendment is selected from humic acid, humic acid salts, humic acid esters, superabsorbent polymers (SAPs), or mixtures thereof. In one embodiment, the organic amendment is humic acid, humic acid salts, humic acid esters, or mixtures thereof. In another embodiment the organic amendment is superabsorbent polymers (SAPs).

SAPs are polymeric materials with strong hydrophilic groups that can absorb large amounts of water. SAPs include polyacrylates, polyvinylalcohols, polyacrylamides, and mixtures thereof. SAPs are often sodium salts prior to creation of the compositions described herein and then in the compositions as described herein, at least some portion to all of the sodium ions are replaced by the rare earth and/or iron cations.

In the present compositions, the ions bound to the organic soil amendment are rare earth cations, iron cations, or mixtures thereof. In certain embodiments the ions are rare earth cations. In other embodiments, the ions are iron cations. And in further embodiments, the ions are a mixture of iron cations and rare earth cations.

The composition as described herein may be a powder or particles or may have any form and/or shape that exposes a maximum of the ions bound to the organic soil amendment to the contaminant. As such, the composition may be in a fixed bed or may be shaped or pressed into pellets, granules, and/or beads, or may be supported on a polymeric structure.

Without being bound by any theory, it is believed that the cations (i.e., the rare earth and/or iron cations) of the soil amendment are capable of preventing contaminants from passing through the amendment by sorbing and/or reacting with the contaminants.

When the ions bound to the soil amendment are rare earth cations, the rare earth cations are deposited on the organic soil amendment from rare earth compounds, such as rare earth salts. In certain embodiments, the rare earth compounds are rare earth salts that are water soluble or water insoluble. For example, in certain embodiments, the rare earth salts are water soluble and include chlorides, nitrates, sulfates, sulfonates, acetates, and mixtures thereof. In other embodiments, the rare earth salts are water insoluble and include carbonates, hydroxides, oxides, and mixtures thereof. The anion of the salt also may be incorporated into the composition. As such, the anion of the salt may be incorporated by also being bound to the organic soil amendment and/or by some amount of anion remaining bound to/coordinated with the rare earth cation.

In these embodiments, the compositions as disclosed herein, comprising an organic soil amendment and rare earth cations bound to the soil amendment, also may further comprise the anions of the salt used to deposit the rare earth cations. In specific embodiments, the composition may further comprise anions selected from the group consisting of chlorides, nitrates, sulfates, sulfonates, carbonates, hydroxides, oxides, and mixtures thereof. These anions may be bound to the organic soil amendment and/or by some amount of anion remaining bound to/coordinated with the rare earth cation. In certain of these embodiments, the composition further comprises anions selected from the group consisting of chlorides, nitrates, sulfates, sulfonates, acetates, and mixtures thereof.

In these embodiments further comprising anions, the organic soil amendment can be SAPs. And in these embodiments, the composition may further comprise sodium ions from the SAPs.

When the ions bound to the soil amendment are iron cations, the iron cations are deposited on the organic soil amendment from iron compounds, such as iron salts. In certain embodiments, the iron compounds are iron salts that are water soluble or water insoluble. For example, in certain embodiments, the iron salts are water soluble and include chlorides, nitrates, sulfates, sulfonates, acetates, and mixtures thereof. In other embodiments, the iron salts are water insoluble and include carbonates, hydroxides, oxides, and mixtures thereof. The anion of the salt also may be incorporated into the composition. As such, the anion of the salt may be incorporated by also being bound to the organic soil amendment and/or by some amount of anion remaining bound to/coordinated with the iron cation.

In these embodiments, the compositions as disclosed herein, comprising an organic soil amendment and iron cations bound to the soil amendment, also may further comprise the anions of the salt used to deposit the iron cations. In specific embodiments, the composition may further comprise anions selected from the group consisting of chlorides, nitrates, sulfates, sulfonates, carbonates, hydroxides, oxides, and mixtures thereof. These anions may be bound to the organic soil amendment and/or by some amount of anion remaining bound to/coordinated with the iron cation. In certain of these embodiments, the composition further comprises anions selected from the group consisting of chlorides, nitrates, sulfates, sulfonates, acetates, and mixtures thereof.

In these embodiments further comprising anions, the organic soil amendment can be SAPs. And in these embodiments, the composition may further comprise sodium ions from the SAPs.

The present application further relates to methods of using rare earth salts or iron salts to make these compositions for treating water and methods of treating aqueous feeds with these compositions comprising an organic soil amendment with ions bound to it. To make the composition, the rare earth salts or iron salts may be provided as a solution or slurry that is contacted with the organic soil amendment to create the composition comprising an organic soil amendment with ions bound to it. The methods of treating the aqueous feeds as disclosed herein may include the steps for making these soil amendment compositions comprising an organic soil amendment with ions bound to it, wherein the ions are rare earth cations, iron cations, or mixtures thereof.

When used to treat an aqueous feed, the compositions, comprising an organic soil amendment with ions bound to it, remove contaminants from the aqueous feed to provide an effluent/treated aqueous stream with a reduced concentration of contaminants relative to the untreated feed. The treated stream may have a reduced concentration of contaminants that achieves a target concentration or that is below a target concentration. Depending on the structure in which it is used, the soil amendment composition with ions bound to it may be refreshed after a certain period of time treating contaminated water. Using the soil amendment composition allows for effective and efficient treatment of aqueous feeds to remove contaminants. Without being bound by any theory, it is believed that the rare earth cations and/or iron cations of the soil amendment composition are capable of preventing contaminants from passing through the amendment, which contaminants would otherwise readily pass through. As such, contacting of the contaminants with the cations leads to the contaminant one or more of sorbing and/or reacting with the cations.

Although the process of the disclosure is primarily envisioned for removing contaminants from water, groundwater or runoff, it will be understood that the process can be used to treat any aqueous liquid feed that contains undesirable amounts of contaminants. Examples of such liquid feeds include, among others, tap water, well water, rainwater, surface waters, such as water from lakes, ponds and wetlands, agricultural waters, wastewater from industrial processes, runoff, and geothermal fluids.

The soil amendment composition with ions bound to it of this disclosure can remove contaminants (the "target contaminant") from a liquid feed. Target contaminants include phosphates, phosphorus containing compounds, arsenic, arsenic containing compounds, PFAS, fluorides, and the like, and mixtures thereof. In certain embodiments, the contaminants are phosphates, phosphorus containing compounds arsenic, arsenic containing compounds, PFAS, fluorides, or mixtures thereof.

As described herein, perfluoroalkyl substances (PFAS) include compounds such as perfluorooctanesulfonate (PFOS), perfluorohexanesulfonate (PFHxS), Nafion by-product 2, 6:2 fluorotelomer sulfonate (6:2 FTSA), 8:2 FTSA, perfluorobutanesulfonate (PFBS), F-53B, and the like. Perfluoroalkyl substances (PFAS) are as described in "A guide to the PFAS found in our environment. Chemical structures and origins of per- and polyfluoroalky substances that are polluting our world", C&EN: CAS (a division of the American Chemical Society) (2020) https://cen.acs.org/sections/pfas.html, the contents of which are incorporated by reference in their entirety.

The soil amendment compositions with ions bound to it as disclosed herein are useful for removing contaminants from an aqueous stream. As described above, the aqueous stream can be one or more of a drinking water, rainwater, runoff, and groundwater source that contain undesirable amounts of contaminants. Furthermore, the aqueous stream can include without limitation well waters, surface waters (such as water from lakes, ponds and wetlands), agricultural waters, wastewater from industrial processes, and geothermal waters.

When the ions are rare earth (RE) cations, the rare earth cations are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y), and mixtures thereof. In certain embodiments, the rare earth cations are light rare earths including cerium (Ce), lanthanum (La), praseodymium (Pr), neodymium (Nd), samarium (Sm), and mixtures thereof.

In certain embodiments, the rare earth cations are selected from the group consisting of cerium, lanthanum, yttrium, and mixtures thereof. In other embodiments, the rare earth cations are selected from the group consisting of cerium, lanthanum, and mixtures thereof.

In particular embodiments, the rare earth cations are Ce, La, or a mixture of Ce and La. In these embodiments, trace amounts (i.e., less than 2%, and in some embodiments less than 1%, by weight of the total weight of rare earth cations) of other rare earth cations may be present. In certain embodiments, these other rare earth cations may be one or more of the light rare earth cations. These embodiments include any amount of Ce and La from pure Ce cations to pure La cations and all mixtures of Ce and La therebetween.

These weight or mol percentages for mixtures of rare earth cations or "pure" rare earth cations are for the rare earth cations relative to other rare earth cations and are not with regard to the overall composition.

In certain embodiment, the rare earth cations are "pure". As used herein, a "pure" cations are 95% or greater of that rare earth by mol, relative to total mol of all rare earth cations present, with any balance being any other rare earth cations.

For example, pure cerium is 95% or greater cerium cations, relative to the total mol of all rare earth cations in the composition. Pure lanthanum is 95% or greater lanthanum cations; pure neodymium is 95% or greater neodymium cations; pure yttrium is 95% or greater yttrium cation; and the like. In some embodiments a "pure" rare earth cation may be 99% or greater of that rare earth, relative to total mol of all rare earths present, and any balance being other rare earths. For example, the rare earth cations may be 99% or greater cerium, relative to the total mol of all rare earth cations in the composition or 99% or greater lanthanum, relative to the total mol of all rare earth cations.

The rare earth cations may be any mixture of cerium and lanthanum, including, for example, from 99.9% cerium and 0.1% lanthanum to 0.1% cerium and 99.9% lanthanum.

The organic soil amendment may be treated with a rare earth by exposing the amendment to a solution or slurry of a rare earth salt. The solution or slurry of rare earth salt typically is in water. The salts can be water soluble (creating a solution) or water insoluble (creating a slurry). For example, soluble rare earth salts may be chlorides, nitrates, sulfates, sulfonates, acetates, and mixtures thereof. For example, insoluble rare earth salts may be hydroxides, carbonates, oxides, and mixtures thereof. In certain embodiments, the rare earth salts are chloride salts. As described above, these anions of the salt also may be incorporated into the compositions as described herein. When part of the composition, the anions may be bound to the organic soil amendment and/or may remain associated with/bound to the rare earth cations.

In certain embodiments of the soil amendment with rare earth cations bound to it, the rare earth cations are a mixture of Ce and La, being 55.0-75.0% by weight Ce, from by weight La, and any balance being other rare earths, based on the total weight of rare earth cations present. In one particular embodiment, the rare earth cations are a mixture of Ce and La, being 55.0-75.0% by weight Ce and 25.0-45.0% La by weight, and the balance of other rare earth cations being less than 2% by weight, based on the total weight of rare earths. In certain embodiments, the balance of other rare earth cations is less than 1% by weight, based on the total weight of rare earths.

The rare earth cations may be 59.8-70.1% Ce by weight and 29.9-40.1% La by weight, of 63.0-69.0% Ce by weight and 30.0-36.0% La by weight, and of 64.0-68.0% Ce by weight and 31.0-35.0% La by weight based on the total weight of rare earth cations present (with or without trace amounts of other rare earth cations) in further embodiments. In a specific embodiment, the rare earth cations are 59.8-70.1% by weight Ce, 29.9-40.1% by weight La, and any balance of being one or more other rare earth cations, wherein the balance is less than 1% by weight, based on the total weight of rare earth cations present.

In additional embodiments, the rare earth cations are 60.0-65.5% mol Ce and 30.0-40.0% mol La based on the total moles of rare earth cations and any balance being one or more other rare earths.

Additional embodiments include rare earth cations of 59.8-70.1% Ce and 29.9 40.1% La, of 63.0-69.0% Ce and 30.0-36.0% La, and of 63.0-68.0% Ce and 31.0-35.0% La (all with any balance being one or more other rare earths and all based on the total moles rare earths) based on the total moles of rare earth cations. In certain embodiments, the balance of any other rare earth cations is less than 2% or less than 1%.

The other rare earth cations that may be present are any one or more of the other rare earths. These other rare earth cations may be selected from the group consisting of Pr, Nd, Sm, Y, and mixtures thereof.

Embodiments of the rare earth cations also include a mixture of Ce and La with 25.0-35.0% Ce and 12.0-20.0% La and the balance being other rare earths. In certain of these embodiments, the balance of other rare earth cations is greater than about 45% or is about 50% or greater. The balance may be a single rare earth or mixture of rare earth cations (that are not Ce and La). For example, the other rare earth cations may be about 50% Y, or about 50% Sm, or a mixture of about 25% Sm and about 25% Y.

In certain embodiments, the rare earth cations are Ce, La, or a mixture of Ce and La, all with less than 2% of other rare earths. In particular embodiments, the rare earth cations are Ce, La, or a mixture of Ce and La, all with less than 1% of other rare earths.

For the purposes of this description unless otherwise specified, % of a rare earth cations versus other rare earth cation(s) is % of rare earth cation by mol relative to total mol of all rare earth cations in the composition, without regard to any anion (such as chloride or nitrate) if the rare earth remains coordinated with an anion from its salt form. Similarly, if the % of one rare earth cation versus other rare earth cation(s) is identified as weight %, it is relative to total weight of all rare earth cations in the composition, without regard to any anion (such as chloride or nitrate) if the rare earth remains coordinated with an anion from its salt form. Common impurities found in rare earths as utilized herein include sodium, iron, lead, and uranium.

With regard to the overall composition, the composition for treating water comprises an organic soil amendment and ions (rare earth cations, iron cations, or mixtures thereof) bound to the soil amendment. The composition comprises about 1% to about 50% by weight cations based on the total weight of the composition. In certain embodiments, the composition comprises about 10% to about 40% by weight cations based on the total weight of the composition. In certain embodiments, these cations are rare earth cations. In other embodiments, these cations are iron cations. These are weight percentages based on the total weight of the composition, not taking into account any residual water in the composition. In some embodiments, the compositions may be dry or dried such that there is no or minimal water and in other embodiments, the compositions may contain residual water, including significant amounts of residual water. For example, when the composition includes a superabsorbent polymer as the organic soil amendment, these superabsorbent polymers can absorb large amounts of water.

In embodiments further comprising anions, the composition comprises about 0.5% to about 10% by weight anions based on the total weight of the composition. In certain of these embodiments, the composition comprises about 0.5% to about 5% by weight anions based on the total weight of the composition. These are weight percentages based on the total weight of the composition, not taking into account any residual water in the composition. In certain embodiments these anions are selected from the group consisting of chloride, nitrate, sulfate, sulfonate, acetate, and mixtures thereof.

The organic amendment of the composition can be SAPs. SAPs are polymeric materials with strong hydrophilic groups that can absorb large amounts of water. SAPs include polyacrylates, polyvinylalcohols, polyacrylamides, and mixtures thereof. These SAPs, in particular polyacrylates and polyvinylalcohols, are commonly sodium salts before treatment with the rare earth salts and/or iron salts as described herein to provide the compositions comprising a soil amendment (SAPs) with ions (selected from iron cations, rare earth cations, or mixtures thereof) bound to it. In these embodiments, at least some portion to all of the sodium cations are replaced by the rare earth cations (or the iron cations). In certain embodiments, a portion of the sodium cations remain in the composition.

In compositions comprising SAPs as the organic soil amendment, the composition also may further comprise anions of the salt used to deposit the rare earth cations (or iron cations). As such, the composition optionally may further comprise one or more of sodium cations from the SAP and anions from the salt used to deposit the rare earth cations (or iron cations). These compositions thus may further comprise ions selected from the group consisting of sodium, chlorides, nitrates, sulfates, sulfonates, carbonates, hydroxides, oxides, and mixtures thereof.

In certain embodiments, the composition may comprise a polyacrylate as the organic soil amendment and rare earth (RE) cations bound thereto. In these embodiments, the composition may be of the formula: $RE_x(acrylate)_yCl_z$, wherein x is about 0.002 to about 1, y is about 1, and z is about 0.0008 to about 2. In certain embodiments x is about 0.4, y is about 1, and z is about 0.085. In this formula (acrylate) is the monomeric unit of the polyacrylate ($C_3H_3O_2$).

In these compositions, most to all of the Na from the Na polyacrylate starting material is removed and replaced with rare earth, with potentially some small amount of Na and/or H remaining on the acrylate because the rare earth salt solutions (and iron salt solutions) are acidic. As such, it is believed that the rare earth cations replace as much Na as possible and any excess is H to balance the charge, with potentially some small amount of residual Na. It is believed that in the above formula, as x increases z would increase too (approximately linearly with each other) while keeping y constant. The highest x:y ratio would be approximately 1:1 and the highest x:y:z ratio is approximately 1:1:2. The lowest x:y:z ratio would be approximately 0.002:1:0.0008.

In other embodiments, the composition may comprise a polyacrylate as the organic soil amendment and iron cations bound thereto. In these embodiments, the composition may be of the formula: $Fe_x(acrylate)_yCl_z$, wherein x is about 0.002 to about 1, y is about 1, and z is about 0.0008 to about 2. In certain embodiments x is about 0.4, y is about 1, and z is about 0.015. In this formula (acrylate) is the monomeric unit of the polyacrylate ($C_3H_3O_2$). In this embodiment, there is more Fe present relative to the acrylate because it is a smaller cation and the Cl is lower because the acrylate can wrap around it easier, which leaves less space for Cl to be incorporated. The highest x:y ratio would be approximately 1:1 and the highest x:y:z ratio is approximately 1:1:2. The lowest x:y:z ratio would be approximately 0.002:1:0.0008.

In compositions comprising humic acid, humic acid salts, esters of a humic acid, or mixtures thereof as the organic soil amendment, the composition also may further comprise anions of the salt used to deposit the rare earth cations (or iron cations). As such, the composition optionally may further comprise ions selected from the group consisting of sodium, chlorides, nitrates, sulfates, sulfonates, carbonates, hydroxides, oxides, and mixtures thereof.

Method of Making Compositions for Treating Water

The method of making the compositions for treating water as disclosed herein includes the steps of selecting or providing the organic amendment and then treating the amendment with an amount of rare earth salts, iron salts, or mixtures thereof to provide an organic amendment with rare earth cations, iron cations, or mixtures thereof bound to the amendment. The amendment may be treated by contacting the amendment with a solution or slurry of rare earth salt, iron salt, or mixture thereof. The slurry or solution may be in water so an aqueous solution or slurry. Optionally, the anions of the salt also may be incorporated into the composition.

As such, the present application relates to methods of making these compositions comprising an organic soil amendment with ions bound to the soil amendment. The methods comprise the steps of: (i) providing an organic soil amendment; and contacting the organic soil amendment with an amount of rare earth salts, iron salts, or mixtures thereof in water to provide the composition comprising an organic soil amendment with cations bound to the soil amendment, wherein the composition comprises about 1% to about 50% by weight cations based on the total weight of the composition wherein the cations are selected from rare earth cations, iron cations, or mixtures thereof. The weight percent of cations based on the total weight of the composition is without taking into account any residual water in the composition. In certain embodiments, the compositions comprises about 10% to about 40% by weight cations based on the total weight of the composition.

In certain embodiments, optionally the anions of the salt also may be incorporated into the composition. In these embodiments, the composition further comprises about 0.5% to about 10% by weight anions based on the total weight of the composition. In certain of these embodiments, the composition further comprises about to about 5% by weight anions based on the total weight of the composition. The weight percent of anions based on the total weight of the composition is without taking into account any residual water in the composition.

In certain embodiments, the methods of making these compositions comprise the steps of: (i) providing an organic soil amendment selected from the group consisting of superabsorbent polymers (SAPs), humic acid, humic acid salts, humic acid esters, and mixtures thereof; and contacting the organic soil amendment with an amount of rare earth salts, iron salts, or mixtures thereof in water to provide the composition comprising an organic soil amendment with cations bound to the soil amendment, wherein the composition comprises about 1% to about 50% by weight cations based on the total weight of the composition. In certain of these embodiments, the salts are rare earth salts and the cations are rare earth cations. In other embodiments, the salts are iron salts and the cations are iron cations. In certain embodiments, the compositions comprises about 10% to about 40% by weight cations based on the total weight of the composition. The weight percent of cations based on the total weight of the composition is without taking into account any residual water in the composition.

Optionally, the anions of the salt, used to incorporate the rare earth and/or iron, also may be incorporated into the composition. In embodiments further comprising anions, the composition comprises about 0.5% to about 10% by weight anions based on the total weight of the composition. In certain of these embodiments, the composition comprises about 0.5% to about 5% by weight anions based on the total weight of the composition. The weight percent of anions based on the total weight of the composition is without taking into account any residual water in the composition.

In certain embodiments of the methods, the methods further include a step of drying the composition comprising an organic soil amendment with ions bound to the soil amendment. The composition can be dried at a temperature of about 40° C. to about 100° C. and more typically at a temperature of about 40° C. to about 75° C. In embodiments in which the organic soil amendment is selected from the group consisting of humic acid, humic acid salts, esters of a humic acid, the drying step is preferred.

In general, the organic soil amendment that is selected is treated by exposing or contacting the organic soil amendment to a solution or slurry containing the rare earth or iron. This solution or slurry containing the rare earth or iron is formed from a rare earth or iron salt in water. The rare earth or iron salt can be a soluble salt (creating a solution) or an insoluble salt suspended in a liquid (creating a slurry). The soluble salts can be chlorides, sulfates, sulfonates, nitrates, acetates, or mixtures thereof. The insoluble salts can be carbonates, hydroxides, oxides, or mixtures thereof. The liquid of the solution or slurry is water. In certain embodiments, the salts are rare earth chlorides and are an aqueous solution.

After the organic soil amendment is contacted with the rare earth or iron salt solution or slurry, the cations are bound to the organic soil amendment providing the composition for treating water as disclosed herein. In certain of these embodiments, the anions of the salt also are incorporated into the composition for treating water.

In embodiments of preparing the composition with a rare earth chloride solution, the solution can be of rare earth chloride salts selected from $CeCl_3$, $LaCl_3$, or a mixture of $CeCl_3$ and $LaCl_3$. The rare earth chloride salts provide the rare earth cations with the Ce to La ratios as described herein.

In embodiments in which the rare earth chloride salts are a mixture of Ce and La and the balance (if any) being chloride salts of other rare earth elements, the other rare earth elements may be any one or more of the other rare earth elements. These other rare earth elements may be selected from the group consisting of Pr, Nd, Sm, Y, and mixtures thereof.

In an embodiment, the rare earth salt may be provided in hydrated crystal form (e.g., $RECl_3 \cdot xH_2O$ (where x is 1 to 8)).

In certain embodiments, the rare earth chloride used to prepare the amendment is $CeCl_3$, $LaCl_3$, or a mixture of $CeCl_3$ and $LaCl_3$, all with less than 2% chloride salts of other rare earth elements based on the total rare earths. And in particular embodiments, the rare earth chloride used to prepare the amendment is $CeCl_3$, $LaCl_3$, or a mixture of $CeCl_3$ and $LaCl_3$, all with less than 1% chloride salts of other rare earth elements. These embodiments include any amount of Ce and La from a pure $CeCl_3$ to a pure $LaCl_3$ and all mixtures of Ce $Cl_3$ and $LaCl_3$ therebetween.

Common impurities found in rare earths salts as utilized herein include sodium, iron, lead, and uranium. In certain embodiments, the rare earth salt solutions or slurries contain less than approximately 10 g/L of these common impurities. The rare earth salt solutions or slurries can include less than approximately 9 g/L of sodium, less than approximately 20 mg/L iron, less than approximately 3 mg/L lead, and less than approximately 1 mg/L uranium.

The concentration of the rare earth chloride solution utilized can be about 0.01 mol/L to about 3.0 mol/L rare earth. In certain embodiments, the concentration of the rare earth chloride solution utilized can be about 2.0 mol/L to about 3.0 mol/L rare earth.

In certain embodiments of the methods for making the compositions for treating water in which the organic soil amendment is a SAP, the methods include the steps of wetting a SAP, treating it with an amount of rare earth salts dissolved or slurried in water, filtering, washing, and drying the resulting solid. The resulting solid is the amendment comprising SAP with rare earth cations bound to it.

These SAPs are commonly sodium salts before treatment with the rare earth salts to provide the compositions comprising SAPs with rare earth cations bound to it. In these embodiments, at least some portion to all of the sodium cations are replaced by the rare earth cations. As such, these compositions may further comprise sodium cations. In these compositions comprising SAPs as the organic soil amendment, the composition also may further comprise anions of the salt used to deposit the rare earth. As such, the composition optionally may further comprise one or more of sodium cations from the SAP and anions from the salt used to deposit the rare earth. These compositions thus may further comprise ions selected from the group consisting of sodium cations, chloride anions, nitrate anions, sulfate anions, sulfonate anions, carbonate anions, hydroxide anions, oxide anions, and mixtures thereof.

In other embodiments of the methods for making the compositions for treating water in which the organic soil amendment is a SAP with iron cations, the methods include the steps of wetting a SAP, treating it with an amount of iron salts dissolved or slurried in water, filtering, washing, and drying the resulting solid. The resulting solid is the amendment with iron cations bound to it.

These SAPs are commonly sodium salts before treatment with the iron salts to provide the compositions comprising SAPs with iron cations bound to it. In these embodiments, at least some portion to all of the sodium cations are replaced by the iron cations. As such, these compositions also may comprise sodium cations. In these compositions comprising SAPs as the organic soil amendment, the composition also may further comprise anions of the salt used to deposit the iron. As such, the composition optionally may further comprise one or more of sodium cations from the SAP and anions from the salt used to deposit the iron.

In these methods of making SAP soil amendment compositions, the methods may further include a step of drying the composition comprising the SAP organic soil amendment with ions bound to it. The composition can be dried at a temperature of about to about 100° C., typically at a temperature of about 40° C. to about 100° C., and more typically at a temperature of about 40° C. to about 75° C.

In the methods for making compositions where the amendment is selected from the group consisting of humic acid, humic acid salts, esters of a humic acid, the methods include the steps of exposing the amendment to a rare earth salt solution or slurry (or an iron salt solution or slurry), filtering, washing, and drying the resulting solid. The resulting solid composition is the organic amendment with rare earth (or iron) cations bound to it. The composition is dried at a temperature of about 25° C. to about 100° C., typically at a temperature of about 40° C. to about 100° C., and more typically, at a temperature of about 40° C. to about 75° C.

In the step of exposing or contacting the organic amendment with the rare earth or iron salt solution or slurry, the mixture can be stirred, heated, filtered, concentrated by evaporation, dried by evaporation at ambient or reduced pressure, and then optionally further dried at elevated temperature. The stirring, heating, or drying time may vary from about 30 seconds to 5 days. In embodiments with heating, it is at typically at a temperature of about 40° C. to about 100° C. and more typically at a temperature of about 50° C. to about 70° C. In certain embodiments, the stirring time is approximately 15-30 minutes. In certain embodiments, the heating time is approximately 15-30 minutes. In certain embodiments, the drying time is approximately 30 minutes to 12 hours.

The composition for treating water, comprising an organic soil amendment and rare earth cations, iron cations, or mixtures thereof wherein the cations are bound to the soil amendment, then can be used to treat aqueous mixtures to remove contaminants.

In certain embodiments, the organic soil amendment can be a SAP and in specific of these embodiments, the SAP can be a polyacrylate. In certain of the embodiments with a polyacrylate as the organic soil amendment, the composition further incorporates one or more of sodium cations from the polyacrylate and anions from the salt used to deposit the rare earth or iron cations.

In other embodiments, the soil amendment can be a humic substance. In certain of these embodiments, the humic substance can be a humic acid, and in certain of these embodiments, the humic substance or humic acid can be generated from finely shredded pine bark.

As described above, these methods make a composition for treating water comprising (a) an organic soil amendment selected from the group consisting of superabsorbent polymers (SAPs), humic acid, humic acid salts, esters of a humic acid, and mixtures thereof and (b) rare earth cations, iron cations, or mixtures thereof, wherein the cations are bound to the soil amendment and wherein the composition comprises about 1% to about 50% by weight cations based on the total weight of the composition. In certain embodiments, the composition comprises about 10% to about 40% by weight cations based on the total weight of the composition. The weight percent of cations based on the total weight of the composition is without taking into account any residual water in the composition. In certain of these embodiments, the cations are rare earth cations.

The composition may further incorporate anions from the salt used to deposit the rare earth ions. In embodiments further comprising anions, the composition further comprises about 0.5% to about 10% by weight anions based on the total weight of the composition. In certain of these embodiments, the composition comprises about 0.5% to about 5% by weight anions based on the total weight of the composition. The weight percent of anions based on the total weight of the composition is without taking into account any residual water in the composition.

Methods of Using the Compositions for Treating Water

The present application relates to methods of treating contaminated water with a composition comprising (a) an organic soil amendment and (b) cations selected from rare earth cations, iron cations, or mixtures thereof, wherein the cations are bound to the soil amendment and wherein the composition comprises about 1% to about 50% by weight of the cations based on the total weight of the composition. In certain embodiments, the cations are rare earth cations and in other embodiments, the cations are iron cations. In certain embodiments, the organic soil amendment is selected from the group consisting of SAPs, humic acid, humic acid salts, and humic acid esters. The weight percent of cations based on the total weight of the composition is without taking into account any residual water in the composition.

While not wanting to be bound by any theory, it is believed that the contaminant in the aqueous stream is removed by contacting with the cations bound to the organic soil amendment of the composition as disclosed herein. It is believed that contacting of the contaminant in the aqueous stream with the cations bound to organic soil amendment leads to the contaminant one or more of sorbing and/or reacting with the cations. As such, some, most, or all, of the contaminant contained in the contaminated aqueous stream is removed from the aqueous stream/feed by contacting with the cations bound to the organic soil amendment composition.

Using the compositions as disclosed herein to treat contaminated water allows for the efficient operation of the water treatment method and provides an effluent/treated stream with reduced concentrations of contaminant in comparison to the water prior to treatment.

The method for removing contaminants from an aqueous stream comprises the steps of (i) contacting an aqueous stream having a first contaminant concentration with a composition comprising (a) an organic soil amendment and (b) cations selected from rare earth cations, iron cations, or mixtures thereof, wherein the cations are bound to the soil amendment and wherein the composition comprises about 1% to about 50% by weight of the cations based on the total weight of the composition; (ii) removing contaminant from the aqueous stream by contact of the aqueous stream with the composition; and (iii) providing an aqueous stream with a second contaminant concentration less than the first contaminant concentration.

In the methods as described herein, the contaminant is selected from the group consisting of phosphate, phosphorus containing compounds, arsenic, arsenic containing compounds, PFAS, fluorides, and mixtures thereof.

In some embodiments, the method of treating water to remove contaminants comprises the steps of passing a water stream containing a first concentration of one or more undesired contaminants through an amount of a composition as described herein having rare earth cations bound to an organic soil amendment and obtaining a treated water stream having a concentration of one or more undesired contaminants less than the first concentration. In other embodiments, the organic soil amendment has iron cations bound thereto.

In certain embodiments, these methods remove at least about 75%, or at least about 80%, or at least about 85%, or at least about 90%, or at least about 95%, or at least about 99% of the contaminant. In the most efficient embodiments, the contaminant is removed at least about 90% or to the limit of detection. In some embodiments the contaminant may be removed to a level at which it is undetectable. The contaminant removed is phosphate, phosphorus containing compounds, arsenic, arsenic containing compounds, PFAS, fluorides, or mixtures thereof.

The methods of treating water to remove contaminants optionally may further comprise one or more steps of setting a target level of contaminant to be removed and/or monitoring the treated stream/effluent for the contaminant. The methods additionally may comprise the step of replacing or renewing the composition comprising the organic soil amendment with ions bound to it if after a period of time or after the contaminant level in the treated stream/effluent beings to increase above (or exceed) the set target or generally beings to increase.

In certain embodiments, the contaminants to be removed from the water stream are phosphates, phosphorus containing compounds, and mixtures thereof. Treating water by passing it through a composition as described herein provides a treated stream/effluent with a reduced concentration of phosphorus in comparison to the water feed. Phosphates and phosphorus containing compounds are monitored by the concentration of phosphorous in the treated stream. The treated stream can have a concentration of phosphorus equal to or less than a target concentration of phosphorus. As such, the method may further comprise the step of setting a target concentration of phosphorus and/or monitoring the treated stream/effluent for phosphorus.

In certain embodiments, the contaminants to be removed from the water stream are arsenic, arsenic containing compounds, or mixtures thereof. Treating water by passing it through a composition as described herein provides a treated stream/effluent with a reduced concentration of arsenic in comparison to the water feed. The treated stream can have a concentration of arsenic equal to or less than a target concentration of arsenic. As such, the method may further comprise the step of setting a target concentration of arsenic and/or monitoring the treated stream/effluent for arsenic.

In certain embodiments, the contaminants to be removed from the water stream are PFAS. Treating water by passing it through a composition as described herein provides a treated stream/effluent with a reduced concentration of PFAS in comparison to the water feed. The treated stream can have a concentration of PFAS equal to or less than a target concentration of PFAS. As such, the method may further comprise the step of setting a target concentration of PFAS and/or monitoring the treated stream/effluent for PFAS.

In certain embodiments, the contaminants to be removed from the water stream are fluorides. Treating water by passing it through a composition as described herein provides a treated stream/effluent with a reduced concentration of fluorides in comparison to the water feed. The treated stream can have a concentration of fluorides equal to or less than a target concentration of fluorides. As such, the method may further comprise the step of setting a target concentration of fluorides and/or monitoring the treated stream/effluent for fluorides.

The concentration of contaminant in the treated stream/effluent after passing through the compositions as described herein can be about or can be set (as a target concentration) at the limit of detection. The concentration of contaminant after passing through the compositions as described herein also can be set at a target concentration based on EPA guidances, standards, or regulations. Then the actual (or measured) concentration of contaminant in the treated stream/effluent after treatment can be equal to or less than this target concentration.

The target concentration also can be set as a percentage reduction of the contaminant in the effluent (treated aqueous stream) versus the concentration in the feed. In certain embodiments, the effluent concentration of contaminant can be 0.5% to about 100% less than the feed concentrate. In certain embodiments, the effluent concentration of contaminant is about 5% to about 50% less than the feed concentration.

In some embodiments, the material comprising the compositions as described herein may be contained within a structure so that the aqueous feed flows through the structure containing the composition for treating water. The composition for treating water may be contained within a smaller structure within the overall structure through which the water flows. If within a smaller structure, when the compositions for treating water as described herein become less effective in removing contaminants over time, the organic soil amendment composition may be replaced or refreshed without disrupting the overall structure in which it is contained. As such, the smaller structure containing the soil amendment compositions with ions bound to it may be close to the inlet of the overall structure or may be close to the outlet of the overall structure so that the aqueous feed flows through it.

In these embodiments, the method may further comprise the steps of setting a target concentration for contaminant; monitoring the concentration of contaminant in the treated stream, and/or replacing or refreshing the soil amendment composition as described herein when the concentration of contaminant increases above (or exceeds) the target concentration. In these embodiments, the replacing or refreshing of the composition includes treatment of the organic soil amendment with a rare earth and/or iron salt solution/slurry as described herein. As such, the organic soil amendment is contacted with rare earth (or iron) salts in water.

In some embodiments, the contaminant-containing aqueous stream is passed through an inlet into a vessel at a temperature and pressure, usually at ambient temperature and pressure, such that the water of the contaminant-containing aqueous stream remains in the liquid state. In this vessel the contaminant-containing aqueous stream is contacted with the soil amendment composition as described herein. The contacting of soil amendment composition with the contaminant-containing aqueous stream leads to the contaminant one or more of sorbing and/or reacting with cations of the soil amendment composition, and in particular with the rare earth cations and/or iron cations. The one or more of sorbing and/or reacting of the cations of the soil amendment composition with the contaminant removes the contaminant from the aqueous stream.

In some embodiments, the compositions for treating water as described herein can be deposited on a support material, such as a polyurethane foam or a polyethylene. Furthermore, the compositions for treating water can be deposited on one or more external and/or internal surfaces of the support material. It can be appreciated that persons of ordinary skill in the art generally refer to the internal surfaces of the support material as pores. The composition can be supported on the support material with or without a binder. In some embodiments, the composition can be applied to the support material using any conventional techniques such as slurry deposition.

In some embodiments, the composition for treating water as described herein is slurried with the contaminant-containing aqueous stream. It can be appreciated that the composition for treating water and the contaminant-containing aqueous stream are contacted when they are slurried. While not wanting to be bound by any theory, it is believed that some amount, if not most or all, of the contaminant contained in the aqueous stream is removed from the aqueous stream by the slurring and/or contacting of the soil amendment composition with the contaminant-containing aqueous stream. Following the slurring and/or contacting of the soil amendment composition with the contaminant-containing aqueous stream, the slurry is filtered by any known solid liquid separation method. Optionally, the filtered and treated aqueous stream can be monitored for the contaminant. The filtered and treated aqueous stream can have a contaminant concentration equal to or less than a target concentration.

The term "some" refers to removing about 10% to about 50% of the contaminant contained in the aqueous stream. More generally, the term "some" refers to one or more of removing about 10%, about 20%, about 30%, or about 40% of the contaminant contained in the aqueous stream. The methods as described herein remove at least some of the target contaminant.

The term "most" refers to removing about 50% to about 90% of the contaminant contained in the aqueous stream. More commonly, the term "most" refers to removing about 60%, about 70%, or about 90% of the contaminant contained in the aqueous stream. Typically, the methods as described herein remove most of the target contaminant.

The term "all" refers to removing about 90% to about 100% of the contaminant contained in the aqueous stream. More generally, the term "all" refers to removing more than 98%, 99%, or 99.5%, or to removing 99.9% of the contaminant contained in the aqueous stream. In certain embodiments, the methods as described herein remove all of the target contaminant.

In certain embodiments, these methods remove at least about 75%, or at least about 80%, or at least about 85%, or at least about 90%, or at least about 95%, or at least about 99% of the contaminant contained in the aqueous. In efficient embodiments, the contaminant is removed at least about 95%.

In some embodiments, the composition for treating water as described herein is in the form of a fixed bed. Moreover, the fixed bed of the composition is normally comprised of the composition in the form of particles. These particles can have any shape and/or form that exposes a maximum of the soil amendment particle surface area to the aqueous liquid and the flow of the aqueous liquid through the bed with minimal back pressure. However, if desired, the soil amendment particles may be in the form of a shaped body such as beads, extrudates, porous polymeric structures or monoliths. In some embodiments, the soil amendment composition as described herein can be supported as a layer and/or coating on such beads, extrudates, porous polymeric structures or monolith supports.

In some embodiments, the soil amendment composition is contained within a smaller structure within the overall fixed bed so it can be removed and refreshed/replaced after a period of time if desired or needed. In these embodiments, the contaminant concentration in the treated stream can be monitored and the soil amendment composition can be removed and refreshed/replaced when the contaminant concentration in the treated stream is above a target concentration or when it begins to increase measurably.

The contacting of the composition for treating water as described herein with the contaminant-containing aqueous stream normally takes place at a temperature from about 4 to about 100 degrees Celsius, more normally from about 5 to about 40 degrees Celsius. In certain embodiments, the contacting takes place at ambient temperature (about 18 to about 25 degrees Celsius). Furthermore, the contacting of soil amendment composition with the contaminant-containing stream commonly takes place at a pH of from about pH 1 to about pH 11, more commonly from about pH 3 to about pH 9.

The contacting of the soil amendment composition with contaminant-containing aqueous stream generally occurs over a period of time of more than about 30 seconds to about 5 days, generally about 30 seconds to about 24 hours, and more generally for a period of time of about 30 seconds to about 5 hours. The removal of contaminant may increase with an increase in contact time.

Treatment of contaminated water by the compositions as described herein can be performed by passing the contaminated water through the soil amendment composition having ions bound to it. In doing so, some pressure may be created to push the water though the soil amendment composition. In other embodiments, the water flows freely through the soil amendment composition.

Figure 1:
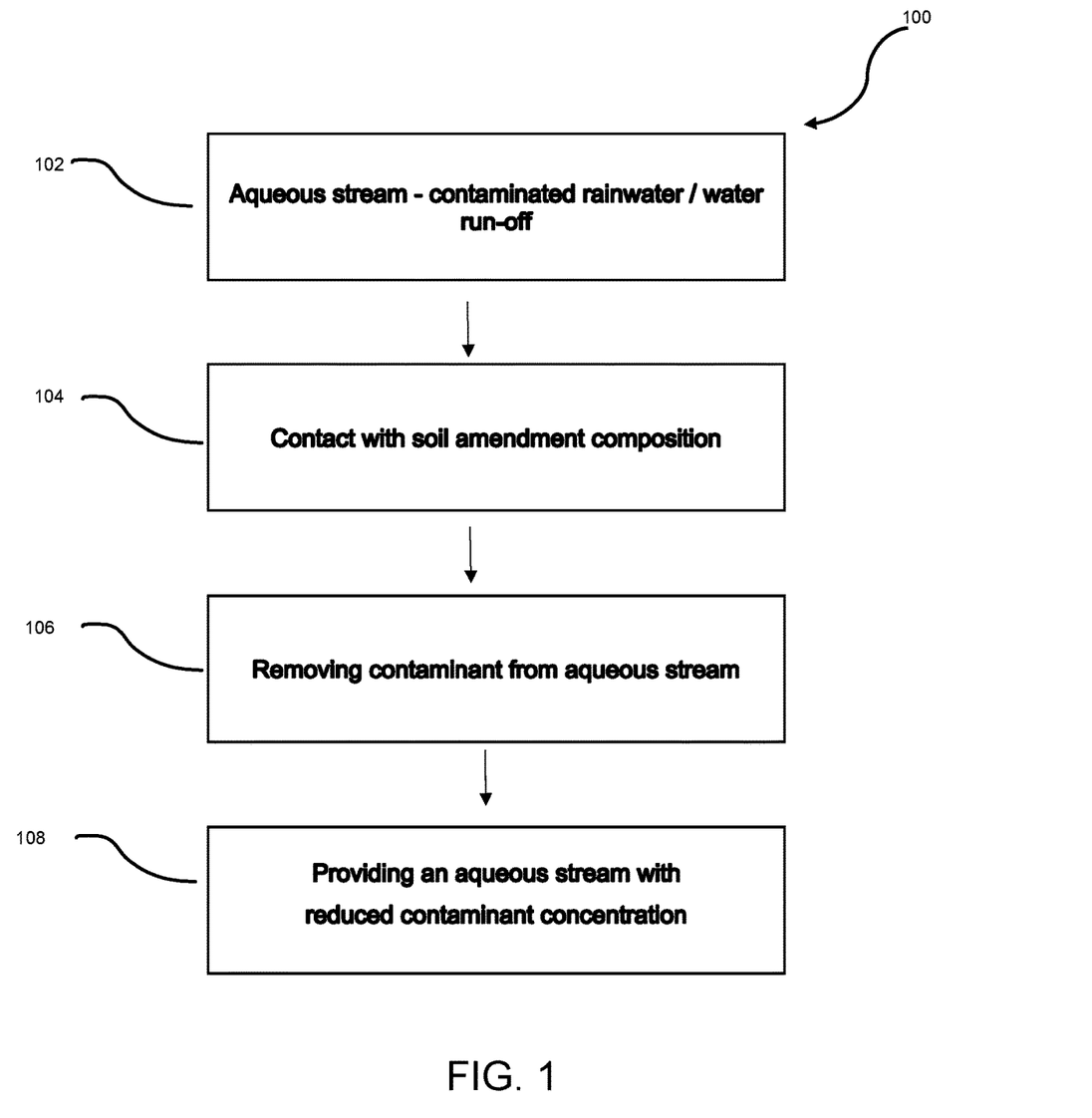
FIG. 1 is a general flow diagram of using the composition for treating water and removing contaminants from an aqueous stream.

FIG. 1 illustrates is a general flow diagram of using the composition for treating water and removing contaminants from an aqueous stream. In the method 100, an aqueous stream to be treated is contaminated rainwater and/or water run-off (102). The contaminant can be phosphate, phosphorus containing compounds, arsenic, arsenic containing compounds, PFAS, fluorides, or mixtures thereof. The contaminated aqueous stream is contacted with the composition as described herein containing an organic soil amendment with cations bound thereto (104). Contacting of the aqueous stream with the composition as described herein removes contaminant from the aqueous stream (106). It is believed that the contaminant in the aqueous stream is removed by contacting with the cations bound to the organic soil amendment. As such, it is believed that contacting of the contaminant with the cations bound to organic soil amendment leads to the contaminant one or more of sorbing and/or reacting with the cations. Then an aqueous stream with a contaminant concentration less than the contaminant concentration of the initial aqueous stream to be treated is provided (108). The method may remove at least about 75%, or at least about 80%, or at least about 85%, or at least about 90%, or at least about 95%, or at least about 99% of the contaminant. In the most efficient embodiments, the contaminant is removed at least about 90% or to the limit of detection. In some embodiments the contaminant may be removed to a level at which it is undetectable.

The method of treating water optionally may further comprise one or more steps of setting a target level of contaminant to be removed from the contaminated aqueous stream of 102 and/or monitoring the provided aqueous stream with reduced contaminant concentration of 108 for the level of contaminant. The method additionally may comprise the step of replacing or renewing the composition comprising the organic soil amendment with ions bound to it if after a period of time or after the contaminant level in the treated aqueous stream of 108 beings to increase above (or exceed) the set target or generally beings to increase.

EXAMPLES

The following Examples are provided to illustrate the inventive rare earth loaded soil amendment composition and methods in more detail, although the scope of the invention is never limited thereby in any way.

Example 1

Figure 4:
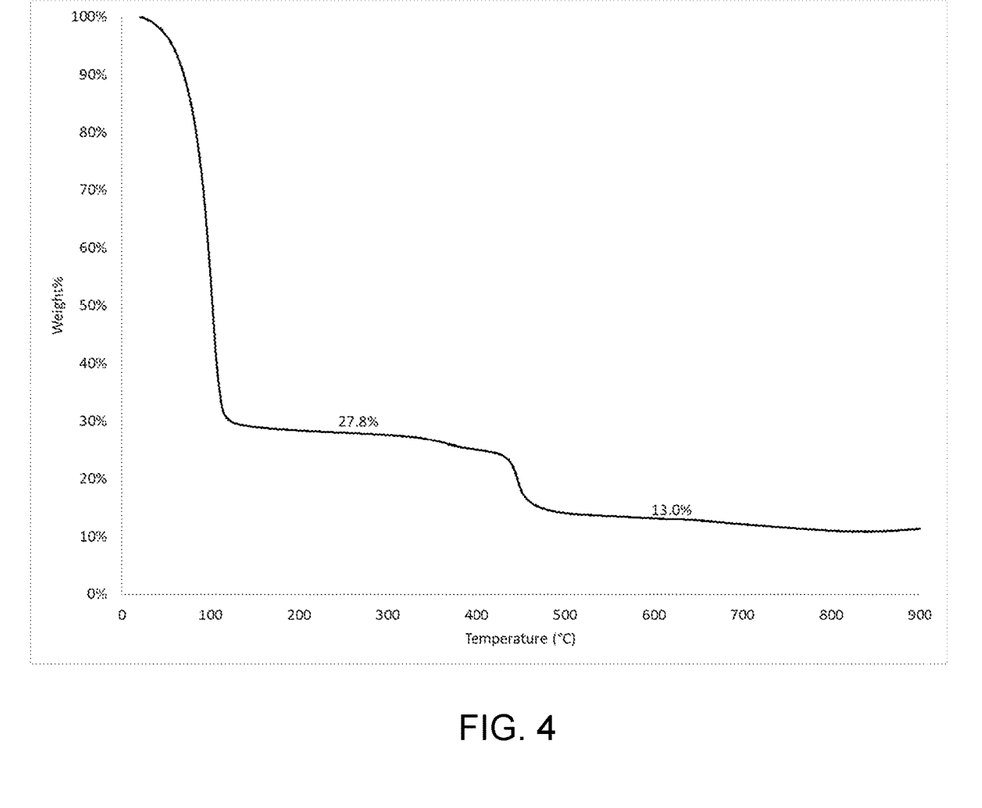
FIG. 4 is a graph of the thermogravimetric analysis of the material of example 1. The weight % of the sample is plotted vs the temperature in ° C. and the weight % is called out at specific temperatures.

A cerium/lanthanum polyacrylate composition was prepared by the following method. 3.0 g of sodium polyacrylate powder ($C_3H_3NaO_2$, FW 93.96 g/mol) was suspended in 1400 ml DI water and stirred. After about 20 minutes the sodium polyacrylate was fully hydrated and nearly invisible in the slurry. Then 4.0 ml of a 2.6 mol/L rare earth chloride solution where the rare earth is a mixture of Ce and La at an approximate 2:1 ratio was added. Nearly instantaneously the appearance of a white precipitate formed. The slurry was stirred for an additional 2 hrs. The solid was then filtered using via gravity through a qualitative paper filter (11 micron porosity). The solid was re-slurried in fresh DI water and filtered repeatedly until a TDS conductivity meter test of the wash water was below 100 ppm. The solid was then allowed to air dry for several hours. A portion of the obtained solid was weighed and dried in an oven at 105° C. for 12 hrs. After drying the remaining mass was reduced by 73.5% indicating the initial solid was ~73.5% water. The dried solid was then burned and reweighed. The final weight was 11% of the initial weight which indicates the solid was 11% rare earth oxide and by difference 15.4% polyacrylate. A thermogravimetric analysis was performed using a TA Q50 TGA with a ramp rate of 10° C./min up to 900° C. under a nitrogen purge. The graph of this analysis is presented in FIG. 4. Water loss occurs around 100° C. and the loss is about 72.2% which corresponds well to the above observed weight loss. A further mass loss occurs around 450° C. and is likely the decomposition of the polyacrylate and is another loss of 14.8% which also corresponds well to the above mass loss. Elemental analysis of the solid found 9.22% C, 9.48% H, and 0.75% Cl. Based on mass losses and elemental analysis a theoretical formula of $(Ce,La)_{0.29}(C_3H_3O_2)_1Cl_{0.085} \cdot 15.2H_2O$ can be proposed.

Example 2

A cerium/lanthanum humate composition was prepared by the following method. A beaker was charged with 100 ml of a 2.6 mol/L rare earth chloride solution where the rare earth is a mixture of Ce and La at an approximate 2:1 ratio. 25 g of sodium humate solid was added and the suspension was stirred and heated to 50° C. After about 20 minutes heating, the suspension was allowed to cool and then the solid was then filtered using a Buchner funnel with a qualitative paper filter and reduced pressure. The solid was washed with fresh DI water until a TDS conductivity meter test of the wash water was below 100 ppm. The solid was then allowed to air dry for several hours. A sample was measured by XRF and Instrumental Gas Analysis (IGA) and found to contain 20% $CeO_2$, 30% C, 12% $SiO_2$, 8% $Al_2O_3$, 6% $Fe_2O_3$, 2% $SO_4$, 2% CaO, 2% $La_2O_3$, and 1% $TiO_2$.

Example 3

Figure 5:
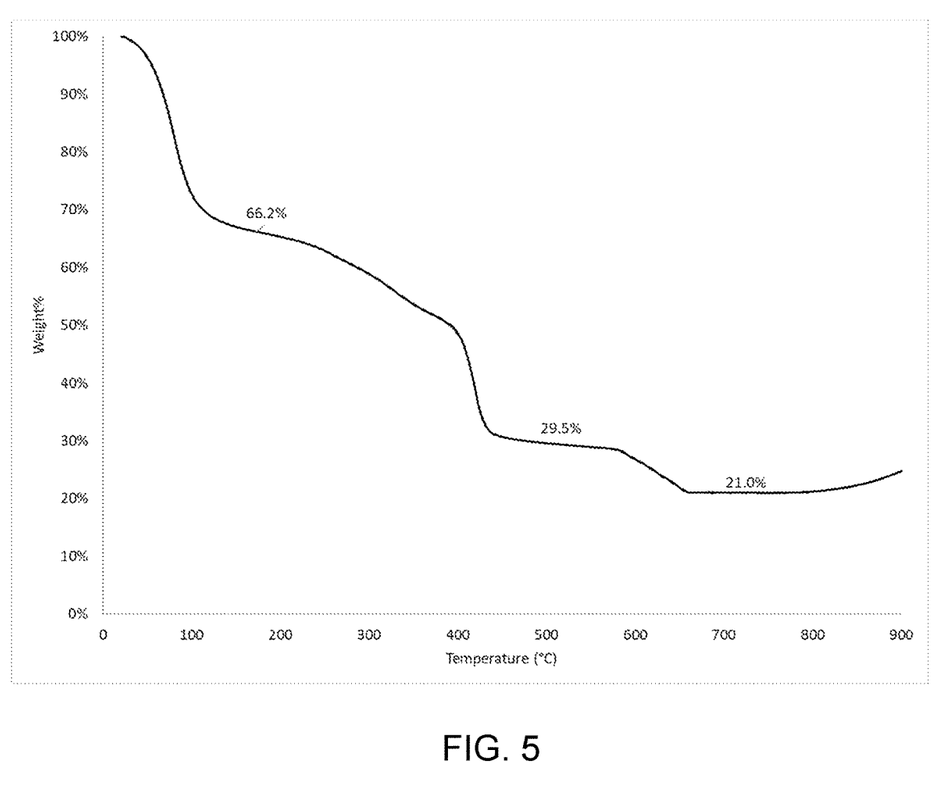
FIG. 5 is a graph of the thermogravimetric analysis of the material of example 3. The weight % of the sample is plotted vs the temperature in ° C. and the weight % is called out at specific temperatures.

An iron polyacrylate composition was prepared by the following method. 5.0 g of sodium polyacrylate powder ($C_3H_3NaO_2$, FW 93.96 g/mol) was suspended in 3500 ml DI water and stirred. After about 60 minutes the sodium polyacrylate was fully hydrated and nearly invisible in the slurry. Then 6.8 ml of a 2.6 mol/L iron(III) chloride solution was added. Nearly instantaneously the appearance of a red-brown precipitate formed. The slurry was stirred for an additional 2 hrs. The solid was then filtered using via gravity through a qualitative paper filter (11 micron porosity). The solid was re-slurried in fresh DI water and filtered repeatedly until a TDS conductivity meter test of the wash water was below 100 ppm. The solid was then allowed to air dry for several hours. A portion of the obtained solid was weighed and dried in an oven at 105° C. for 12 hrs. After drying the remaining mass was reduced by 35.8% indicating the initial solid was ~35.8% water. The dried solid was then burned and reweighed. The final weight was 17% of the initial weight which indicates the solid was 17% iron oxide and by difference 47.2% polyacrylate. A thermogravimetric analysis was performed using a TA Q50 TGA with a ramp rate of up to 900° C. under a nitrogen purge. The graph of this analysis is presented in FIG. 5. Water loss occurs around 100° C. and the loss is about 33.8% which corresponds well to the above observed weight loss. A further mass loss occurs around 450° C. and 600° C. and is likely the decomposition of the polyacrylate. The final mass is around 21% of the initial weight, thus 45.2% more mass was lost which also corresponds well to the above mass loss. Elemental analysis of the solid found 26% C, 5.66% H, and 0.37% Cl. Based on mass losses and elemental analysis a theoretical formula of $Fe_{0.4}(C_3H_3O_2)_1Cl_{0.015} \cdot 2.5H_2O$ can be proposed.

Example 4

An aluminum polyacrylate composition was attempted following methods similar to Example 1 and 3. The method failed to produce a usable solid as the aluminum did not appear to bind to the polyacrylate.

Example 5

Figure 2:
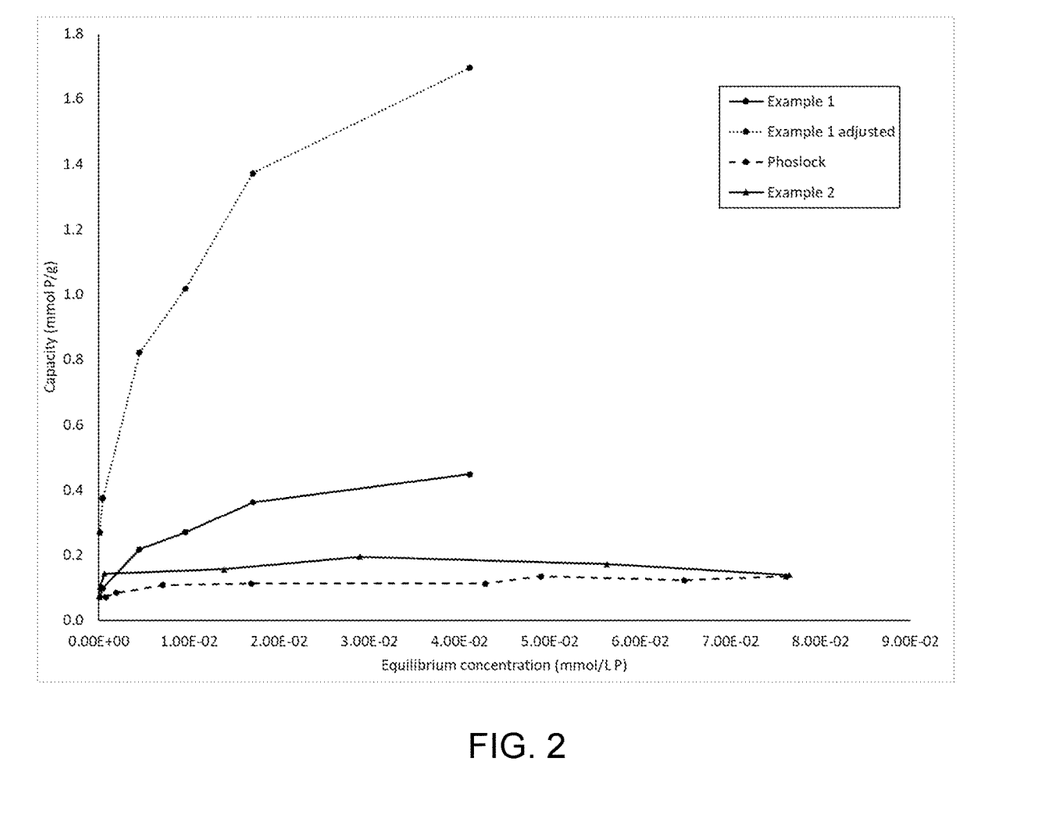
FIG. 2 is a graph of the phosphate adsorption curve for the material of example 1, the material of example 1 adjusted for the amount of water in the material, Phoslock as a comparative example, and the material of example 2.
Figure 3:
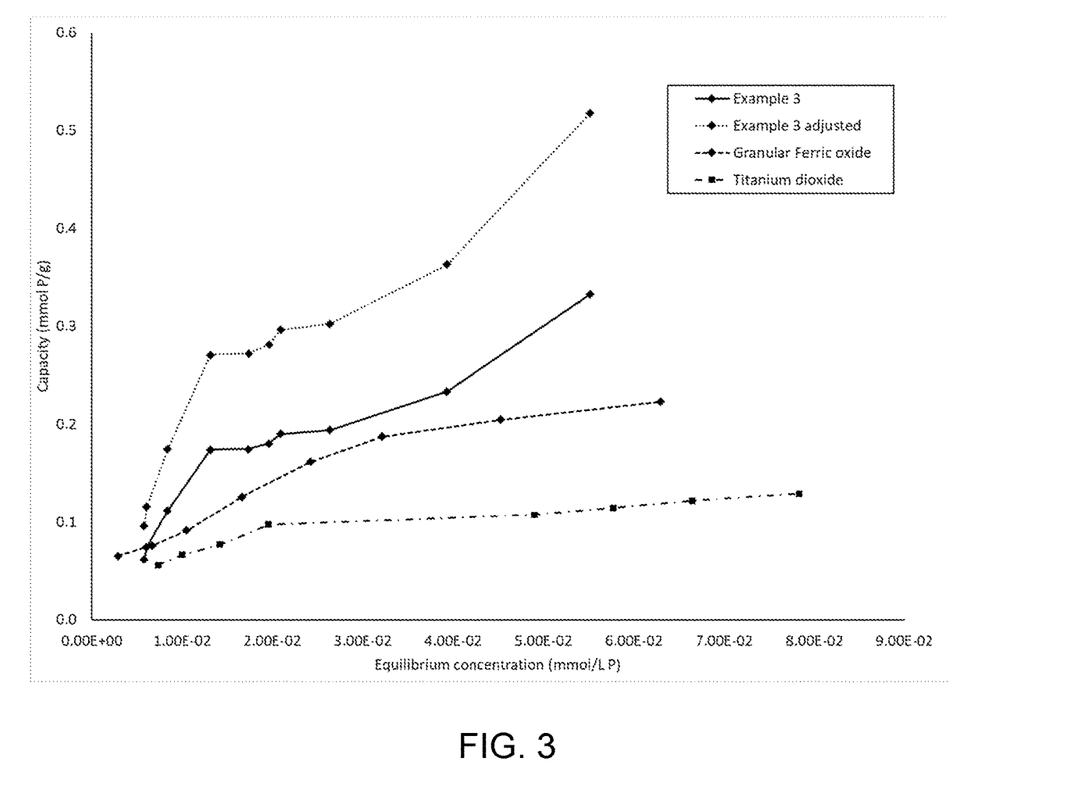
FIG. 3 is a graph of the phosphate adsorption curve for the material of example 3, the material of example 3 adjusted for the amount of water in the material, granular ferric oxide as a comparative example, and titanium dioxide as a comparative example.

To test the phosphorus removal capacity of these substances and comparative substances the following experiment is done. Five liters each of 2 solutions are prepared using DI water and sodium phosphate monobasic with target concentrations of 1 and 3 mg/L P. Each solution is divided into five 1 L containers. To 4 of these containers ~100, 200, 300, and 400 mg of the test substance is added. The fifth container is left as a control. The containers are then placed into a tumbler and tumbled for 24 hours. The samples of the solutions are then filtered through a 0.45 micron syringe filter, analyzed for P using Hach method 10080, and reported in units of mmol/L P. The difference between the control and the test solution is calculated as the amount of P bound to the solid. This number multiplied by the solution volume and divided by the solid weight is the calculated capacity given in mmol/g. Results for each material are in the table below. The results are also plotted in FIG. 2 and FIG. 3 with the final P concentration in mmol/L P plotted on the horizontal axis and the capacity in mmol of P per gram of solid plotted on the vertical axis. The 3 materials from the above examples were tested along with common inorganic phosphorus removal medias such as granular ferric oxide (TL Reefs for use in saltwater aquariums), Phoslock (SePro, a La bentonite clay for use in natural water bodies), and Titanium Dioxide (Aeroxide P25, $TiO_2$). The results are plotted in this way because it graphically depicts the distribution of the contaminant (P) between the amount adsorbed on the solid and the amount remaining in solution at equilibrium. Materials that adsorb better will, not only have a higher capacity, but will have a large slope at lower concentrations and have a slope that approaches zero at the concentration where the maximum capacity is reached. The materials from Example 1 and 3 are also plotted removing the water from the measured mass of the solid, thus showing the improved adsorption of P by these materials over the common inorganic adsorption medias.

TABLE 1

Capacity measurement of the solids from Example 1.

| Mass of solid (g) | Initial P conc. (mmol/L) | Final P conc. (mmol/L) | Capacity (mmol/g) | Capacity adjusted for $H_2O$ (mmol/g) |
|---|---|---|---|---|
| 0.432 | $3.09 \times 10^{-5}$ | $1.29 \times 10^{-4}$ | 0.071 | 0.269 |
| 0.306 | $3.09 \times 10^{-5}$ | $4.53 \times 10^{-4}$ | 0.099 | 0.375 |
| 0.405 | $9.27 \times 10^{-5}$ | $4.53 \times 10^{-3}$ | 0.218 | 0.822 |
| 0.308 | $9.27 \times 10^{-5}$ | $9.61 \times 10^{-3}$ | 0.270 | 1.018 |
| 0.031 | $2.83 \times 10^{-5}$ | $1.71 \times 10^{-2}$ | 0.363 | 1.371 |
| 0.115 | $9.27 \times 10^{-5}$ | $4.11 \times 10^{-2}$ | 0.449 | 1.694 |

TABLE 2

Capacity measurement of the solids from Example 2.

| Mass of solid (g) | Initial P conc. (mmol/L) | Final P conc. (mmol/L) | Capacity (mmol/g) |
|---|---|---|---|
| 0.398 | $3.03 \times 10^{-5}$ | $6.47 \times 10^{-5}$ | 0.076 |
| 0.294 | $3.03 \times 10^{-5}$ | $1.29 \times 10^{-4}$ | 0.102 |
| 0.206 | $3.03 \times 10^{-5}$ | $6.80 \times 10^{-4}$ | 0.144 |
| 0.105 | $3.03 \times 10^{-5}$ | $1.39 \times 10^{-2}$ | 0.156 |
| 0.317 | $9.08 \times 10^{-5}$ | $2.90 \times 10^{-2}$ | 0.195 |
| 0.200 | $9.08 \times 10^{-5}$ | $5.63 \times 10^{-2}$ | 0.172 |
| 0.102 | $9.08 \times 10^{-5}$ | $7.65 \times 10^{-2}$ | 0.140 |

TABLE 3

Capacity measurement of the solids from Example 3.

| Mass of solid (g) | Initial P conc. (mmol/L) | Final P conc. (mmol/L) | Capacity (mmol/g) | Capacity adjusted for $H_2O$ (mmol/g) |
|---|---|---|---|---|
| 0.406 | $3.09 \times 10^{-5}$ | $5.83 \times 10^{-3}$ | 0.062 | 0.096 |
| 0.332 | $3.09 \times 10^{-5}$ | $6.12 \times 10^{-3}$ | 0.075 | 0.116 |
| 0.201 | $3.09 \times 10^{-5}$ | $8.38 \times 10^{-3}$ | 0.112 | 0.174 |
| 0.102 | $3.09 \times 10^{-5}$ | $1.31 \times 10^{-2}$ | 0.174 | 0.271 |
| 0.039 | $2.83 \times 10^{-5}$ | $1.73 \times 10^{-2}$ | 0.175 | 0.272 |
| 0.063 | $2.83 \times 10^{-5}$ | $1.97 \times 10^{-2}$ | 0.181 | 0.281 |
| 0.048 | $2.83 \times 10^{-5}$ | $2.09 \times 10^{-2}$ | 0.190 | 0.296 |
| 0.010 | $2.83 \times 10^{-5}$ | $2.64 \times 10^{-2}$ | 0.194 | 0.302 |
| 0.229 | $9.27 \times 10^{-5}$ | $3.93 \times 10^{-2}$ | 0.233 | 0.363 |
| 0.113 | $9.27 \times 10^{-5}$ | $5.52 \times 10^{-2}$ | 0.332 | 0.517 |

TABLE 4

Capacity measurement of Granular Ferric Oxide.

| Mass of solid (g) | Initial P conc. (mmol/L) | Final P conc. (mmol/L) | Capacity (mmol/g) |
|---|---|---|---|
| 0.414 | $2.99 \times 10^{-5}$ | $2.91 \times 10^{-3}$ | 0.065 |
| 0.306 | $2.99 \times 10^{-5}$ | $6.76 \times 10^{-3}$ | 0.076 |
| 0.212 | $2.99 \times 10^{-5}$ | $1.06 \times 10^{-2}$ | 0.091 |
| 0.106 | $2.99 \times 10^{-5}$ | $1.66 \times 10^{-2}$ | 0.126 |
| 0.421 | $9.24 \times 10^{-5}$ | $2.43 \times 10^{-2}$ | 0.162 |
| 0.321 | $9.24 \times 10^{-5}$ | $3.22 \times 10^{-2}$ | 0.188 |
| 0.230 | $9.24 \times 10^{-5}$ | $4.53 \times 10^{-2}$ | 0.205 |
| 0.132 | $9.24 \times 10^{-5}$ | $6.29 \times 10^{-2}$ | 0.223 |

TABLE 5

Capacity measurement of Phoslock.

| Mass of solid (g) | Initial P conc. (mmol/L) | Final P conc. (mmol/L) | Capacity (mmol/g) |
|---|---|---|---|
| 0.408 | $2.99 \times 10^{-5}$ | $7.77 \times 10^{-4}$ | 0.071 |
| 0.330 | $2.99 \times 10^{-5}$ | $1.97 \times 10^{-3}$ | 0.085 |
| 0.211 | $2.99 \times 10^{-5}$ | $7.12 \times 10^{-3}$ | 0.108 |
| 0.115 | $2.99 \times 10^{-5}$ | $1.69 \times 10^{-2}$ | 0.113 |
| 0.437 | $9.24 \times 10^{-5}$ | $4.29 \times 10^{-2}$ | 0.113 |
| 0.322 | $9.24 \times 10^{-5}$ | $4.90 \times 10^{-2}$ | 0.135 |
| 0.224 | $9.24 \times 10^{-5}$ | $6.49 \times 10^{-2}$ | 0.123 |
| 0.120 | $9.24 \times 10^{-5}$ | $7.62 \times 10^{-2}$ | 0.135 |

TABLE 5

Capacity measurement of Titanium Dioxide.

| Mass of solid (g) | Initial P conc. (mmol/L) | Final P conc. (mmol/L) | Capacity (mmol/g) |
|---|---|---|---|
| 0.403 | $2.99 \times 10^{-5}$ | $7.35 \times 10^{-3}$ | 0.056 |
| 0.301 | $2.99 \times 10^{-5}$ | $1.00 \times 10^{-2}$ | 0.066 |
| 0.205 | $2.99 \times 10^{-5}$ | $1.42 \times 10^{-2}$ | 0.077 |
| 0.106 | $2.99 \times 10^{-5}$ | $1.96 \times 10^{-2}$ | 0.097 |
| 0.404 | $9.24 \times 10^{-5}$ | $4.90 \times 10^{-2}$ | 0.107 |
| 0.302 | $9.24 \times 10^{-5}$ | $5.78 \times 10^{-2}$ | 0.115 |
| 0.212 | $9.24 \times 10^{-5}$ | $6.65 \times 10^{-2}$ | 0.122 |
| 0.109 | $9.24 \times 10^{-5}$ | $7.83 \times 10^{-2}$ | 0.129 |

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the compositions and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A composition for treating water comprising (a) an organic soil amendment selected from the group consisting of superabsorbent polymers (SAPs), humic acid, humic acid salts, humic acid esters, and mixtures thereof and (b) rare earth cations, wherein the cations are bound to the soil amendment and wherein the composition comprises about 1% to about 50% by weight rare earth cations based on the total weight of the composition not taking into account any water present in the composition.

2. The composition of claim 1, wherein the organic soil amendment is superabsorbent polymers selected from the group consisting of polyacrylates, polyvinylalcohols, polyacrylamides, and mixtures thereof.

3. The composition of claim 1, wherein the rare earth cations are selected from the group consisting of cerium, lanthanum, yttrium, and mixtures thereof.

4. The composition of claim 1, further comprising anions selected from the group consisting of chloride, nitrate, sulfate, sulfonate, acetate, and mixtures thereof.

5. The composition of claim 4, wherein the composition comprises about 0.5% to about 10% by weight anions based on the total weight of the composition not taking into account any water present in the composition.

6. The composition of claim 4, wherein the organic soil amendment is superabsorbent polymers and the composition further comprises sodium cations.

7. The composition of claim 1, wherein the rare earth cations are 55.0-75.0% by weight Ce, from 25.0-45.0% by weight La, and any balance being one or more other rare earth cations.

8. The composition of claim 1, wherein the rare earth cations are 59.8-70.1% by weight Ce, 29.9-40.1% by weight La, and any balance being one or more other rare earth cations.

9. The composition of claim 1, wherein the rare earth cations are 55.0-75.0% by weight Ce, from 25.0-45.0% by weight La, and any balance of one or more other rare earth cations being less than 1% by weight based on the total rare earth cations.

10. The composition of claim 1, wherein the rare earth cations are 59.8-70.1% by weight Ce, 29.9-40.1% by weight La, and any balance being less than 1% by weight of one or more other rare earth cations based on the total rare earth cations.

11. The composition of claim 1, wherein the rare earth cations are 60.0-65.5% mol Ce and 30.0-40.0% mol La based on the total moles of rare earth cations and any balance being one or more other rare earth cations.

12. The composition of claim 1, wherein the rare earth cations are Ce, La, or a mixture of Ce and La.

13. The composition of claim 1, wherein the composition comprises about 10% to about 40% by rare earth cations based on the total weight of the composition not taking into account any water present in the composition.

\* \* \* \* \*

UNITED STATES PATENT AND TRADEMARK OFFICE
CERTIFICATE OF CORRECTION

PATENT NO. : 11,931,721 B2
APPLICATION NO. : 17/718075
DATED : March 19, 2024
INVENTOR(S) : Mason Reames Haneline It is certified that error appears in the above-identified patent and that said Letters Patent is hereby corrected as shown below:

In the Specification

In Column 1, Line 11, replace "herein their entirety" with --in their entirety--.

In Column 22, Table 1, Line 7, replace "Initial P conc. (mmo/L)" with --Initial P conc., mol/L)--.

In Column 22, Table 2, Line 25, replace "Initial P conc. (mmo/L)" with --Initial P conc., mol/L)--.

In Column 22, Table 3, Line 41, replace "Initial P conc. (mmo/L)" with --Initial P conc., mol/L)--.

In Column 22, Table 4, Line 57, replace "Initial P conc. (mmo/L)" with --Initial P conc., mol/L)--.

In Column 23, Table 5, Line 5, replace "Initial P conc. (mmo/L)" with --Initial P conc., mol/L)--.

In Column 23, Table 5, Line 15, replace "Table 5" with --Table 6--.

In Column 23, Table 5, Line 20, replace "Initial P conc. (mmo/L)" with --Initial P conc., mol/L)--.

Signed and Sealed this
Sixteenth Day of July, 2024

Katherine Kelly Vidal
*Director of the United States Patent and Trademark Office*